Nov. 1, 1960         G. T. SHOOSMITH         2,958,310
                    PUMP CONTROL APPARATUS
Filed Jan. 17, 1958                    2 Sheets-Sheet 1

Nov. 1, 1960   G. T. SHOOSMITH   2,958,310
PUMP CONTROL APPARATUS

Filed Jan. 17, 1958   2 Sheets-Sheet 2

Inventor
Guy Taite Shoosmith
By Dowell & Dowell
Attorneys

United States Patent Office 2,958,310
Patented Nov. 1, 1960

2,958,310

PUMP CONTROL APPARATUS

Guy Taite Shoosmith, St. Mary Bourne, England, assignor to Plenty and Son Limited, Newbury, England Filed Jan. 17, 1958, Ser. No. 709,697

Claims priority, application Great Britain Jan. 24, 1957

5 Claims. (Cl. 121—41)

This invention relates to pump installations comprising two or more variable capacity pumps which deliver their outputs into a common delivery line. Such an installation is useful for delivering a blend or mixture of two or more different liquids, such as a mixture of heavy oil and diesel oil for use as fuel for a marine engine.

In most cases it is necessary that the combined output of the pumps should be variable, but any variation in the total output delivered must not alter the proportions of the constituent liquids in the output. A pump installation which meets these requirements is described in United States Patent No. 2,845,867, and the present invention is a development of the installation shown therein.

According to the invention, a pump installation for delivering a liquid blend comprises two or more variable capacity pumps each having a sliding block which can be moved hydraulically under the control of a valve to alter its capacity. The valves of the pumps are linked mechanically, hydraulically, pneumatically or electrically to each other and to a common control member so that they are operated in unison when it is desired to vary the combined output of the pumps. However, the amount of hydraulic fluid which each valve allows to pass to move its associated sliding block upon a given displacement of the common control member is variably proportional to that displacement, the actual proportion being governed by the setting of an adjustable linkage between the valve and the sliding block.

Thus, if the installation comprises two identical pumps one of which is delivering 30% of its output and the other of which is delivering 40% of its output, an increase of 50% in the total combined output of the pumps must result in the output of the first pump being increased from 30% to 45% and the output of the second pump being increased from 40% to 60%. The actual increase in output in the two pumps is therefore quite different even though the valves of the pumps are linked to a common control member which serves to alter the total combined output of the pumps. The difference between the increases in the individual outputs results of course from different settings of the adjustable linkages provided in each pump, and while these settings are unaltered the proportions of the constituent liquids in the blend will remain the same whether the total combined output be large or small.

In order that the invention may be thoroughly understood, a specific installation in accordance with it will now be described, by way of example, with reference to the accompanying drawings, in which.

Figure 1:
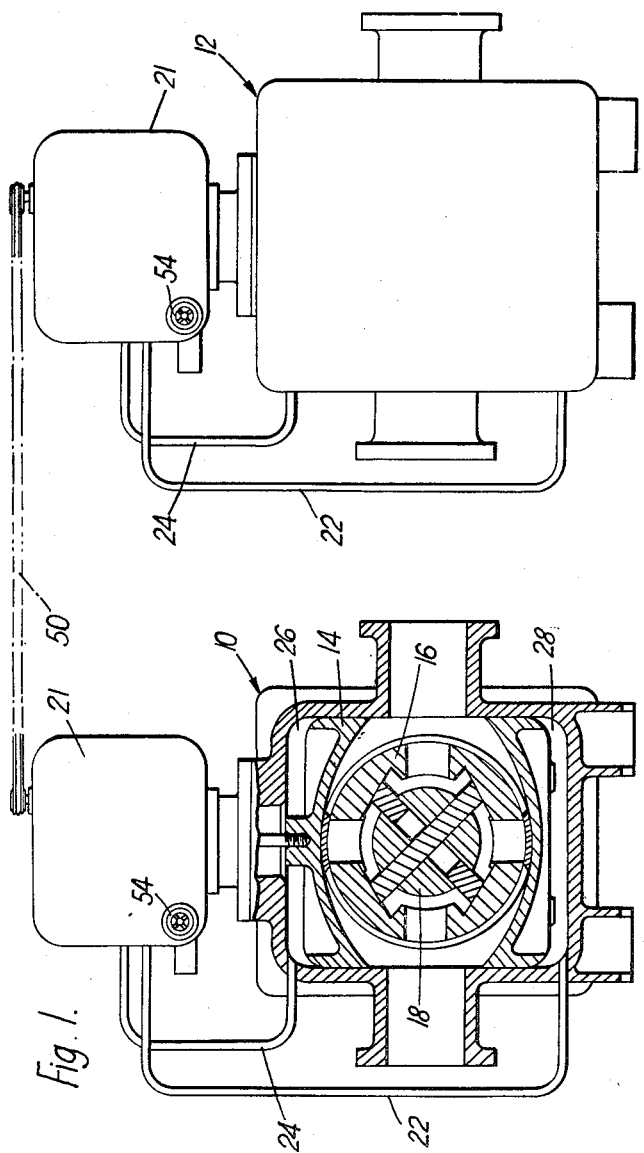
Figure 1 is a side view of the installation with parts in vertical section.
Figure 2:
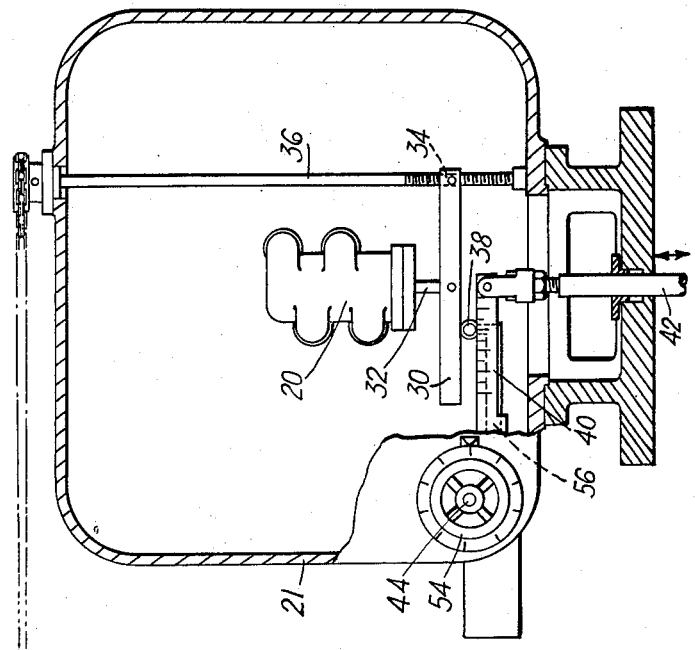
Figure 2 is an enlarged, more detailed side view of part of the installation shown in Figure 1.
Figure 2:
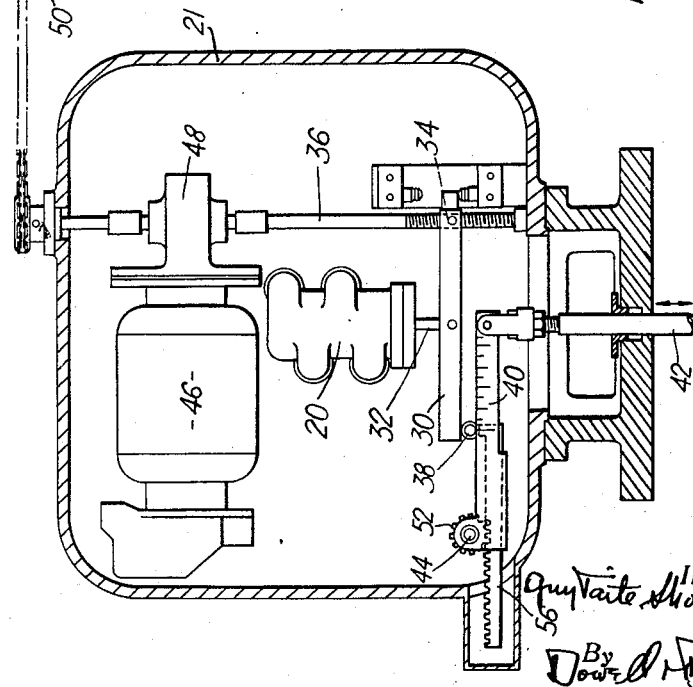

The installation comprises two variable capacity pumps 10 and 12 of the sliding vane type which deliver their outputs into a common delivery line (not shown). The pumps are preferably constructed as described in British Patent No. 827,877 and comprise a sliding block 14 which can be moved up and down to alter the capacity of the pump by varying the relative positions of the rotor 16 and the rotor shaft 18. The sliding block 14 in each pump is moved by hydraulic liquid which acts direct on the upper and lower surfaces of the sliding block itself and which will normally be the same liquid as the pump is handling. A piston valve 20 is provided in a casing 21 on each pump through which hydraulic liquid can be selectively delivered or withdrawn through pipes 22 and 24 to and from spaces 26 and 28 immediately above and beneath the sliding block 14 so as to alter its position in the pump housing, the valve 20 being of a kind which hydraulically locks the sliding block in position during those times when it is desired that the capacity of the pump remain substantially constant. Although the pumping chamber of the pump 12 has not been shown in section in Figure 1, it is to be understood that this part of the pump is identical to the corresponding part of the pump 10.

The valve 20 in each pump 10 and 12 is connected by an adjustable mechanical linkage to the sliding block 14 so that when each sliding block reaches a desired position in its pump housing, the valve 20 is automatically stopped from delivering and withdrawing any more hydraulic liquid to and from the spaces 26 and 28 in the pump housing above and below the sliding block. The adjustable linkage between each sliding block 14 and its associated valve 20 consists of a lever 30 pivotally attached at its centre to the piston rod 32 of the piston valve. At one of its ends, the lever 30 has a pivotally-mounted nut 34 which is threaded on a lead screw 36, and at the other end it bears on a fulcrum 38 which is movable along another lever 40. The provision of this movable fulcrum 38 is very important, as the setting of this fulcrum determines the proportion of hydraulic fluid which the valve 20 will allow to pass upon movement of the lead screw 36. For the sake of convenience, the lever 40 is referred to herein as the "block follower lever" because it is pivotally attached at one of its ends to a rod 42 extending up from the sliding block 14 and thus follows any movement of the block. The other end of the block follower lever 40 is pivotally secured at 44 to a stationary support.

The lead screws 36 of the pumps 10 and 12 are linked to each other and to a common control member so that the total combined output of the pumps can be varied as desired. The common control member in this instance is the shaft (not shown) of a reversible electric pilot motor 46 which is arranged in the casing 21 of the pump 10. The motor shaft drives the lead screw 36 of the pump 10 through gearing located in the gear housing 48, and the two lead screws 36 are linked together mechanically by a chain drive 50. This chain drive could be replaced by a belt drive or a gear-wheel drive. Alternatively, an electrical linkage can be provided which includes the use of synchronous motors such as those sold under the registered trademarks "Selsyn" and "Magslip," this form of linkage being suitable if the two pumps are spaced widely apart. If convenient, it is also possible to provide a pneumatic or hydraulic link. Whatever kind of link is used however, its function is to ensure that displacement of the common control member is transmitted to both lead screws 36.

When it is desired to vary the total combined output of the pumps and therefore move the sliding blocks 14 of the pumps up or down into new positions, the electric motor 46 is started up so that its shaft is displaced with the result that both lead screws 36 are rotated by the same amount in the appropriate sense and their follower nuts 34 are thereby moved the same distance along them.

Such movement displaces each piston valve 20 which therefore supplies and withdraws hydraulic liquid to and from the spaces 26 and 28 on either side of its associated sliding block 14. This in turn causes the sliding block 14 to move, and the block follower lever 40 moves with it. Movement of the lever 40 alters the position of the fulcrum 38 for the other lever 30 (without altering the setting of the fulcrum 38 along the lever 40), so that the centre of the lever 30 is restored to its original position, although the ends of the lever 30 are now in quite different positions from those which they occupied originally.

The restoration of the centre of the lever 30 to its original position results in the piston of the valve 20 similarly being restored to the position in which it cuts off the supply or withdrawal of any further quantity of hydraulic liquid to and from the spaces 26 and 28 on either side of the sliding block 14. The sliding blocks are therefore hydraulically locked in their new positions.

It will be seen that although the extent to which the sliding blocks 14 are moved is partially dependent on the number of revolutions by which the lead screws 36 are rotated, the ratio between the displacements of the two sliding blocks 14 is governed by the settings of the fulcra 38 which are movable along the block follower levers 40. Each of these fulcra 38 can be set in a large number of positions along its associated block follower lever 40, and is moved by means of a rotatable gear pinion 52 arranged on the shaft 44 which provides a pivotal mounting for the block follower lever 40. The pinion 52 is turned by a handle 54 and serves, on rotation, to move a rack 56 which is attached at one end to the fulcrum 38. As long as the settings of the two fulcra 38 remain undisturbed, the proportions of the liquids in the blend will be the same whatever the position or displacement of the common control member.

It will be seen therefore that operation of the pilot motor 46 is effective to alter the combined output of the pumps without varying the proportions of the constituent liquids in the output, while operation of the handles 54 enables the proportions of the constituent liquids to be adjusted as and when desired.

Although the invention has been described above as applied to a particular kind of sliding vane pump, it may be incorporated in any variable capacity pump the capacity of which can be varied either by means of a sliding block as described above, or by means of an external cylinder and operating piston mechanically coupled to the capacity-adjusting member of the pump.

I claim:

1. Pump control apparatus comprising at least two hydraulic valves for regulating the flow of hydraulic control fluid to and from a corresponding number of pumps, an adjustable linkage attached to each one of said valves and including a first lever and a second lever, connecting means on said second lever whereby said second lever may be connected to a moving part of one of said pumps, connecting means on said first lever connecting said first lever to a rotatable member, an electric pilot motor drivingly connected to one of said rotatable members associated with one of said valves, a driving connection connecting said one rotatable member to said other rotatable member associated with said other valve, a movable fulcrum for said first lever of each of said adjustable linkages, and manually-operable means for shifting each of said movable fulcrums independently of the other.

2. Pump control apparatus as claimed in claim 1, wherein each of said rotatable members comprises a lead screw.

3. Pump control apparatus as claimed in claim 1 wherein said rotatable members are mechanically connected to each other by a chain drive.

4. Pump control apparatus as claimed in claim 1 wherein each one of said valves is pivotally connected to the middle portion of said first lever associated therewith, said fulcrum for each of said first levers being movable along said second levers assoicated therewith.

5. Pump control apparatus as claimed in claim 1 wherein said manually-operable means for shifting each of said movable fulcrums comprises a rack and pinion device for each fulcrum.

References Cited in the file of this patent

UNITED STATES PATENTS

| | | |
|---|---|---|
| 1,821,502 | Ellis | Sept. 1, 1931 |
| 2,524,055 | Hubert | Oct. 3, 1950 |
| 2,621,632 | Ifield | Dec. 16, 1952 |
| 2,845,867 | Shoosmith | Aug. 5, 1958 |

FOREIGN PATENTS

| | | |
|---|---|---|
| 774,525 | Great Britain | May 8, 1957 |